US008397501B2

(12) United States Patent
Barker

(10) Patent No.: US 8,397,501 B2
(45) Date of Patent: Mar. 19, 2013

(54) AUTOMOTIVE AIR BLOWER

(75) Inventor: Luke Barker, Northampton (GB)

(73) Assignees: Nexxtdrive Limited, London (GB);
Integral Powertrain Limited, Milton Keynes (GB)

( * ) Notice: Subject to any disclaimer, the term of this patent is extended or adjusted under 35 U.S.C. 154(b) by 577 days.

(21) Appl. No.: 12/599,138

(22) PCT Filed: Apr. 29, 2008

(86) PCT No.: PCT/GB2008/001494
§ 371 (c)(1),
(2), (4) Date: Mar. 31, 2010

(87) PCT Pub. No.: WO2008/135722
PCT Pub. Date: Nov. 13, 2008

(65) Prior Publication Data
US 2010/0186725 A1    Jul. 29, 2010

(30) Foreign Application Priority Data
May 8, 2007  (GB) .................................. 0708835.4

(51) Int. Cl.
  F02B 33/44  (2006.01)
  F02B 33/00  (2006.01)
  F16H 3/72   (2006.01)
  F16H 37/06  (2006.01)
  F16H 31/00  (2006.01)
  F16H 37/02  (2006.01)
(52) U.S. Cl. ...... 60/608; 60/607; 123/559.1; 123/559.3; 475/5; 475/218; 475/136
(58) Field of Classification Search ............ 60/607–609; 123/559.1–559.3; 475/5, 128, 136, 218
See application file for complete search history.

(56) References Cited

U.S. PATENT DOCUMENTS

| 3,572,167 A | * | 3/1971 | Bosko et al. | 475/218 |
| 4,738,110 A | * | 4/1988 | Tateno | 123/559.3 |
| 4,766,873 A | * | 8/1988 | Miyagi et al. | 123/559.3 |

(Continued)

FOREIGN PATENT DOCUMENTS

| EP | 304384 A1 * | 2/1989 |
| EP | 331355 A1 * | 9/1989 |

(Continued)

OTHER PUBLICATIONS

International Search Report Corresponding to Application PCT/GB/2008/001494 dated Aug. 19, 2008.

*Primary Examiner* — Thai Ba Trieu
(74) *Attorney, Agent, or Firm* — Young & Thompson

(57) ABSTRACT

An automotive air blower includes an air pump (14) connected to the output shaft of a transmission system, whose input shaft is connected, in use, to the engine (16) of a motor vehicle. The input and output shafts are connected to the ring gear (10) and sun gear (13), respectively, of a three-branch epicyclic differential gearset. The planet carrier (12) of the gearset is connected to the rotor (2) of an electric motor/generator and the input shaft is connected to the rotor of an electrical machine (1), which constitutes at least a generator. The electrical connections of the stators of the two machines are connected together via a controller arranged to control the flow of electrical power between them. A selectively engageable mechanical connection (15) is provided between two of the branches of the gearset and arranged to connect the two branches together such that the gearset will rotate as a single unit.

8 Claims, 1 Drawing Sheet

U.S. PATENT DOCUMENTS

| | | | | |
|---|---|---|---|---|
| 4,996,966 A * | 3/1991 | Hitomi et al. | | 123/559.3 |
| 5,079,913 A * | 1/1992 | Kishishita | | 60/597 |
| 5,138,840 A * | 8/1992 | Oguchi et al. | | 60/624 |
| 5,875,766 A * | 3/1999 | Ozawa | | 60/609 |
| 5,879,259 A * | 3/1999 | Teraoka et al. | | 475/136 |
| 5,937,831 A * | 8/1999 | Volkmann et al. | | 123/559.3 |
| 6,058,916 A * | 5/2000 | Ozawa | | 123/559.3 |
| 6,102,013 A * | 8/2000 | Lee | | 123/559.1 |
| 6,289,882 B1 * | 9/2001 | Slicker | | 123/559.3 |
| 6,375,442 B1 * | 4/2002 | Ward et al. | | 192/109 R |
| 6,634,344 B2 * | 10/2003 | Stretch | | 123/559.3 |
| 6,666,194 B2 * | 12/2003 | Wildner | | 123/559.3 |
| 7,172,524 B2 * | 2/2007 | Moeller | | 475/5 |
| 7,484,368 B2 * | 2/2009 | Jorgensen | | 60/607 |
| 7,703,283 B2 * | 4/2010 | Barker | | 60/608 |
| 7,765,805 B2 * | 8/2010 | Lofgren | | 60/608 |
| 2005/0092307 A1 * | 5/2005 | Middlebrook et al. | | 123/559.1 |
| 2006/0180130 A1 | 8/2006 | St. James | | |
| 2006/0264296 A1 * | 11/2006 | Moeller | | 475/275 |
| 2007/0137626 A1 | 6/2007 | Turner | | |
| 2010/0170245 A1 * | 7/2010 | Amos et al. | | 60/607 |
| 2010/0199956 A1 * | 8/2010 | Lofgren | | 123/565 |
| 2011/0100339 A1 * | 5/2011 | Weyer et al. | | 123/563 |
| 2011/0126536 A1 * | 6/2011 | Lofgren | | 60/607 |
| 2011/0131983 A1 * | 6/2011 | Lofgren | | 60/607 |
| 2011/0131984 A1 * | 6/2011 | Lofgren | | 60/607 |
| 2011/0138808 A1 * | 6/2011 | Lofgren | | 60/607 |
| 2012/0035014 A1 * | 2/2012 | Moeller | | 475/5 |

FOREIGN PATENT DOCUMENTS

| | | | |
|---|---|---|---|
| GB | 2398108 A * | 8/2004 | |
| JP | 60128935 A * | 7/1985 | |
| JP | 62131920 A * | 6/1987 | |
| JP | 03179141 A | 8/1991 | |
| WO | WO 03047897 A1 * | 6/2003 | |
| WO | 2004072449 A1 | 8/2004 | |
| WO | WO 2006079433 A1 * | 8/2006 | |

* cited by examiner

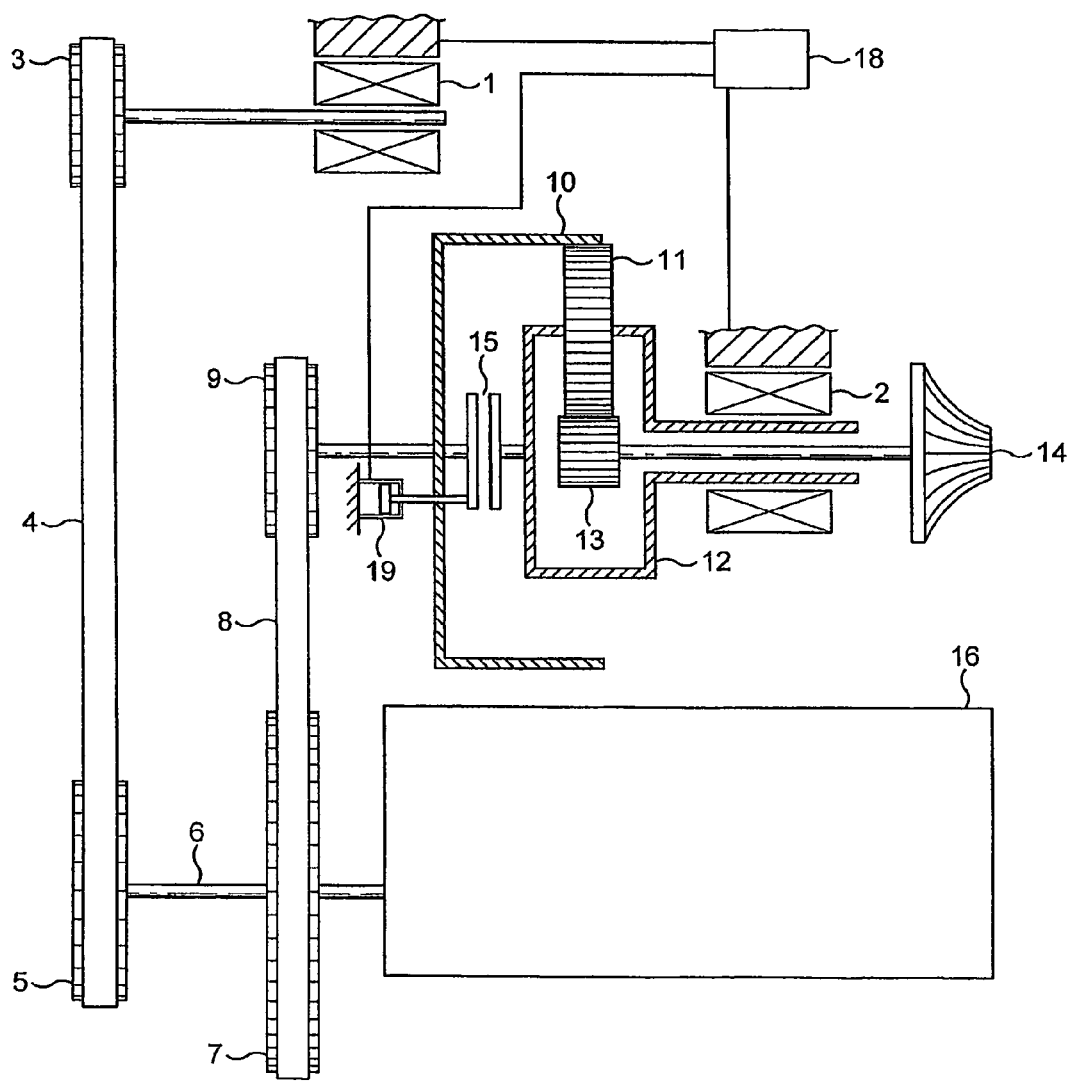

AUTOMOTIVE AIR BLOWER

BACKGROUND OF THE INVENTION

1. Field of the Invention

The present invention relates to automotive air blowers and particularly to automotive superchargers. More specifically, the present invention is concerned with automotive air blowers of the type disclosed in WO 2004/072449.

2. Description of the Related Art

WO 2004/072449 discloses an automotive supercharger comprising an air impeller, which is situated, in use, in the inlet duct of an engine and is connected to the output shaft of a transmission system, the input shaft of which is connected, in use, to be driven by the engine. The transmission system comprises a three-branch epicyclic gearset. In the embodiment of FIG. 1, the gearset comprises a sun wheel, which is connected to the output shaft of the gearset, constituting a first branch, and is in engagement with a plurality of planet wheels, which are rotatably carried by a rotatable planet carrier, constituting a second branch and connected to the input shaft of the transmission system, and are in engagement with an annulus wheel, constituting the third branch. The second and third branches are connected to the rotors of respective electrical machines constituting motor/generators, the electrical stator connections of which are connected via a controller arranged to control the flow of power between them.

In use, mechanical power is transmitted from the engine to the impeller via the transmission system. One or other electrical machine is usually caused to operate as a generator and the power it produces is transmitted to the other motor/generator, which operates as a motor. The speed of the impeller can thus be controlled as desired independently of engine speed to match the instantaneous supercharging requirement of the engine.

The prior document specifically states that one or other of the motor/generators may be used for engine starting purposes and this is clearly advantageous because it will permit the conventional automotive starter motor to be omitted. However, if one were to attempt to use the motor/generator connected to the planet carrier as a starter motor in the construction of the prior application, it would in fact be wholly ineffectual because rotating the planet carrier when the input shaft is stationary will merely result in rotation of the transmission output shaft and thus of the air impeller and not in the rotation of the transmission input shaft and thus of the engine itself, which is of course necessary if the engine is to be started.

In practice, the electrical machine connected to the transmission shaft runs at relatively high speed whilst that connected to the planet carrier may have a lower maximum speed requirement. In order to be able to start an internal combustion engine, an electrical starter motor must be able to generate a high torque level, at least for a brief period of time. This means that if the electrical machine connected to the transmission input shaft is to be used for starting purposes, it will have to be of high speed/high torque type. However, an electrical machine of high speed/high torque type is expensive, bulky and heavy and this is commercially unacceptable for most applications.

BRIEF DESCRIPTION OF THE INVENTION

It is therefore the object of the present invention to provide an automotive air blower of the type referred to above which is capable, when installed in a vehicle, of starting the vehicle engine, thereby permitting the conventional starter motor to be omitted, whilst nevertheless being acceptably compact and cheap to manufacture.

Thus according to the present invention, an automotive air blower of the type comprising an air pump connected to the output shaft of a transmission system, the input shaft of which is connected, in use, to the engine of a motor vehicle, the input and output shafts being connected to first and second branches, respectively, of a three-branch epicyclic differential gearset, the third branch of the gearset and the input shaft being connected to the rotor of respective electrical machines, one of which constitutes a motor/generator and the other of which is arranged to operate at least as a generator, the electrical connections of the stators of which machines are connected together via a controller arranged to control the flow of electric power between them, is characterised by a selectively engageable mechanical connection between two of the branches of the gearset arranged to connect the two branches together such that the gearset will rotate as a single unit. In the preferred embodiment, the mechanical connection comprises a rotary shaft and a selectively engageable clutch.

Thus in the air blower in accordance with the present invention, two of the branches of the epicyclic gearset may be selectively locked together and the result of this is that the entire gearset will be locked up and will rotate as a single unit. In normal operation of the blower, the mechanical connection will be disengaged and the blower will operate substantially in the manner disclosed in WO 2004/072449. However, if the engine should not be operating and it is desired to start it, the mechanical connection is engaged and the electrical machine which is not connected to the input of the transmission system and constitutes a motor/generator, has electrical power supplied to it and thus operates as a motor. This causes the entire gearset to rotate as a unit and thus rotates the input shaft of the transmission system and thus also the output shaft of the engine of the motor vehicle. The engine of the vehicle is thus rotated and caused to start. The motor/generator configured to operate also as an Integrated Starter Generator is inherently of relatively low speed type and must necessarily be configured also to be of high torque type in order to be able to provide sufficient torque to rotate and thus start the engine. It is, however, a relatively simple matter to configure a low speed electrical machine to be also of high torque type and this does not involve any substantial increase in the size and expense of the motor/generator in question. The problem referred to above of a substantial increase in size and expense when using the other electrical machine as a starter motor is therefore eliminated. It will be appreciated also that the selectively engageable connection may be actuated at those times when regenerative braking of the vehicle is required and this will result in one or both of the electrical machines being rotated by the energy of the moving vehicle and thus acting as generators producing electrical power which may be returned to the vehicle battery.

In one embodiment, the clutch is of centrifugal type and is constructed to be engaged at low speed but automatically to disengage when a predetermined speed is reached. Such a centrifugal clutch will therefore inherently always be engaged when the engine of the vehicle is not running. The motor/generator connected to the output shaft or the planet carrier of the transmission system may therefore be used as a starter motor without it being necessary to take any steps to engage the clutch. Once the engine starts and reaches a predetermined speed, the clutch automatically disengages and the transmission system will then operate in the normal manner.

In a further embodiment, the clutch is of one-way type and thus permits relative rotation in one direction but not the other. Such a one-way clutch would not impair the normal operation of the blower but would enable torque to be transmitted to the engine from the planet carrier in order to start it or to assist starting.

In a modified embodiment, the clutch includes a motor or actuator, which is arranged to engage and disengage the clutch under the control of signals supplied to it by the same or a different controller, to which it is connected. Such a controllable clutch will be necessary if it is desired to lock the transmission system for the purpose of regenerative braking because the transmission system is likely to be rotating at such times at a speed in excess of that at which a centrifugal clutch would engage.

Both of the electrical machines may constitute motor/generators, as described in connection with the specific embodiments in WO 2004/072449. However, motor/generators are relatively expensive due to the necessity of providing the necessary electronic commutation gear and a significant financial economy can be achieved if one of the electrical machines has no motoring capability and is thus simply a generator. In this event, however, operation of the blower is restricted, as described in more detail in WO 2004/072449.

In the preferred embodiment, the gearset comprises a sun wheel connected to the air pump and in engagement with a plurality of planet wheels carried by a common carrier, which is connected to the rotor of the motor/generator, the planet wheels being in engagement with an annulus wheel, which is connected to the input shaft of the transmission system and to the rotor of the generator. It is preferred that the selectively engageable mechanical connection extends between the common carrier and the annulus wheel, The sun wheel, planet wheels and annulus wheel of the epicyclic gearset may all be toothed gearwheels of conventional type in mesh with one another. However, it is equally possible that they all comprise roller gearwheels, torque being transmitted between the engaging pairs of wheels by frictional engagement of their surfaces.

BRIEF DESCRIPTION OF DRAWINGS

Further features and details of the invention will be apparent from the following description of one specific embodiment which is given by way of example only with reference to the single accompanying drawing which is a highly diagrammatic view of an automotive supercharger in accordance with the invention connected to an automotive engine.

DETAILED DESCRIPTION OF THE PREFERRED EMBODIMENTS

An automotive engine 16 has an output shaft connected to a pulley wheel 7, which is connected by means of a belt 8 to rotate a further pulley wheel 9. The pulley wheel 9 is connected to the input shaft of an epicyclic transmission system, the output shaft of which is connected to a centrifugal air impeller 14 situated in the inlet duct of the engine 16. The input shaft of the transmission system is connected to a ring gear or annulus gear 10 of the differential gearset. The ring gear 10 is in mesh with a number of planet gears 11, which are rotatably carried by a common carrier 12. The planet gears 11 are in mesh with a sun gear 13, which is connected to the output shaft of the transmission and thus to the air impeller 14. The planet carrier 12 is connected to the rotor 2 of an electric motor/generator.

As thus far described, the supercharger is substantially the same as that illustrated in FIG. 4 of WO 2004/072449. It does, however, differ from it in two significant aspects:

Firstly, the output shaft 6 of the engine 16 is connected not only to the pulley wheel 7 but also to a further pulley wheel 5. The pulley wheel 5 is connected by means of a further belt 4 to a further pulley wheel 3. The pulley wheel 3 is connected to the rotor 1 of a generator and this constitutes one of the electrical machines of the supercharger. However, the generator 1 is not integrated into the supercharger but is remote from it and, in this embodiment, constitutes the alternator of the motor vehicle which is in any event conventionally provided. As in WO 2004/072449, the electrical stator connections of the two electrical machines are connected together via a controller 18 arranged to control the flow of electrical power between the two machines and thus to control the speed of the air impeller 14 in accordance with the instantaneous boost requirement of the engine 15.

Secondly, the planet carrier 12 of the transmission system is mechanically connected to the annulus wheel 10 by a mechanical connection which includes a controllable clutch 15. The clutch may be centrifugally controlled or, as illustrated, may include an actuator 19 connected to the controller 18. The clutch may thus be engaged and disengaged in response to signals issued by the controller.

In normal operation, the supercharger operates much as described in WO 2004/072449 and during such normal operation the clutch 15 is disengaged and the mechanical connection between the ring gear 10 and the planet carrier 12 is therefore inoperative. However, if the engine is not operating and it is desired to start it, the controller issues a signal to the clutch 15 which causes it to engage, thereby locking the planet carrier 12 and the annulus wheel 10 together. Power is then supplied to the motor/generator 2, which is caused to operate as a motor. It rotates the planet carrier 12 and thus also, as a result of engagement with the clutch 15, the ring gear 10. This results in turn in rotation of the engine output shaft 15 and the engine is thus caused to start. Once the engine has started, the clutch 15 is disengaged and normal operation of the supercharger commences.

A further benefit of the present invention is that, if the mechanical connection is in the form of an actively controlled clutch or a one-way clutch, it can be used to improve operation during rapid engine deceleration (e.g. gear shift). For example in the illustrated embodiment the speed of the planet carrier is limited in the direction of rotation of the input shaft rotation to the speed of rotation of that shaft. This is advantageous because under certain conditions, particularly at high engine speed and when no supercharging is required, the planet carrier may be rotating at high speed or even a similar speed to the input shaft. In the event of a gear change the input shaft speed may be rapidly reduced and supercharging may be demanded. Under these conditions the planet carrier must slow down very rapidly and may be required to accelerate in the opposite direction to the input shaft. Without the present invention this would be done by applying torque to the electrical machine which is attached to the planet carrier. By engaging the clutch the reduction in engine speed will itself cause a reduction in planet carrier speed, thereby improving response and reducing the required rating of the electrical machine.

The invention claimed is:

1. An automotive air blower, comprising:
   an air pump connected to an output shaft of a transmission system, an input shaft of the transmission system being connected, in use, to an engine of a motor vehicle, the input and output shafts being connected to first and second branches, respectively, of a three-branch epicyclic differential gearset, the third branch of the gearset and the input shaft being connected to a rotor of respective electrical machines, one of the electrical machines being a motor/generator and another of the electrical machines operating at least as a generator, the electrical connections of stators of the electrical machines being connected together via a controller arranged to control the flow of electric power between the electrical machines, wherein a selectively engageable and disengageable mechanical connection between two of the branches of the gearset is provided and configured to connect the two branches together such that the gearset will rotate as a single unit, the mechanical connection comprising a rotary shaft and a selectively engageable and disengageable clutch.

2. The air blower as claimed in claim 1, wherein the clutch is a centrifugal clutch and is constructed to be engaged at low speed but automatically disengage when a predetermined speed is reached.

3. The air blower as claimed in claim 1, wherein the clutch includes an actuator, which is arranged to engage and disengage the clutch and is connected to be controlled by a controller.

4. The air blower as claimed in claim 1, wherein both electrical machines constitute motor/generators.

5. The air blower as claimed in claim 1, wherein one electrical machine is a motor/generator and the other electrical machine is only a generator.

6. The air blower as claimed in claim 5, wherein the gearset comprises a sun wheel connected to the air pump and in engagement with a plurality of planet wheels carried by a common carrier connected to the rotor of the motor/generator, the planet wheels being in engagement with an annulus wheel connected to the input shaft of the transmission system and to the rotor of the generator.

7. The air blower as claimed in claim 6, wherein the selectively engageable mechanical connection extends between the common carrier and the annulus wheel.

8. An automotive air blower, comprising:
an air pump connected to an output shaft of a transmission system, an input shaft of the transmission system being connected, in use, to an engine of a motor vehicle, the input and output shafts being connected to first and second branches, respectively, of a three-branch epicyclic differential gearset, the third branch of the gearset and the input shaft being connected to a rotor of respective electrical machines, one of the electrical machines being a motor/generator and another of the electrical machines operating only as a generator, the electrical connections of stators of the electrical machines being connected together via a controller arranged to control the flow of electric power between the electrical machines,
wherein a selectively engageable and disengageable mechanical connection between two of the branches of the gearset is provided and configured to connect the two branches together such that the gearset will rotate as a single unit,
the gearset comprises a sun wheel connected to the air pump and in engagement with a plurality of planet wheels carried by a common carrier connected to the rotor of the motor/generator, the planet wheels being in engagement with an annulus wheel connected to the input shaft of the transmission system and to the rotor of the generator, and
the selectively engageable mechanical connection extends between the common carrier and the annulus wheel.

* * * * *

UNITED STATES PATENT AND TRADEMARK OFFICE
CERTIFICATE OF CORRECTION

PATENT NO. : 8,397,501 B2  Page 1 of 1
APPLICATION NO. : 12/599138
DATED : March 19, 2013
INVENTOR(S) : Luke Barker It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 719 days.

Signed and Sealed this

First Day of September, 2015

Michelle K. Lee
*Director of the United States Patent and Trademark Office*